Patented Jan. 1, 1952

2,581,315

UNITED STATES PATENT OFFICE 2,581,315

CONTROL SYSTEM FOR INDUCTION MOTOR AND BRAKING GENERATOR COMBINATIONS

Richard G. Widdows and Alvin C. Dyer, Shaker Heights, and Harold J. Rathbun, Cleveland, Ohio, assignors to The Electric Controller & Manufacturing Company, Cleveland, Ohio, a corporation of Ohio Application August 25, 1950, Serial No. 181,364

10 Claims. (Cl. 318—203)

This invention relates to systems of control for motor drives in which a polyphase wound rotor induction motor coupled to an artificial load is utilized for apparatus in which the actual load at times overhauls and drives the motor and its artificial load and in which the overhauling load must be retarded to limit its speed. The invention is particularly applicable to hoist applications and is hereinafter described as applied to that use.

Braking generators have been used as artificial loads for wound rotor induction motors driving the hoist motion of cranes to give under-synchronous speed control during hoisting as well as during both power and overhauling lowering. When used for braking purposes, generators of the eddy current type, commonly referred to as "eddy current brakes," possess some advantages, such as simplicity and cost, over D.-C. excited squirrel cage machines and D.-C. shunt, series, or compound generators having external load circuits.

Until recently, eddy current brakes were of limited advantage in hoist applications because of the pronounced decrease in torque with speed after reaching a predetermined maximum torque, as evidenced by their so-called drooping speed-torque characteristics. Recent improvements in the design of eddy current generators or brakes have eliminated the need of auxiliary equipment for preventing the torque of the eddy current brake from decreasing at high speeds. Accordingly, the substitution of the improved eddy current brakes for the earlier eddy current brakes, generators, and other equivalent artificial loading means for wound rotor motors in hoist equipments has resulted in obvious advantages of simplicity and economy. Even so, the improved eddy current brakes leave something to be desired in hoist applications.

For example, when excited at constant voltage, the torque output of these improved brakes reaches a predetermined maximum value at relatively low speed and, while not decreasing, nevertheless, as the speed increases, either does not continuously increase or increases less rapidly than is desirable for most efficient braking in hoist applications. Consequently, since the lowering torque of an overload on a hoist may exceed the full load torque of the motor, safety requires that the eddy current brake, when excited at a predetermined constant voltage, have a maximum torque output considerably in excess of the full load torque of the motor. This is particularly important if the motor is to be deenergized and the brake alone used for lowering in any speed point, or if the motor is to operate under balanced voltage conditions with a relatively large secondary resistance in any lowering speed point. In addition to the obvious disadvantages of the cost and space requirements of the larger brake, the larger brake, when excited with a constant voltage sufficient to cause adequate torque to be produced in the higher speed range of some lowering speed points, often produces too much torque for most efficient operation in the lower speed range of those speed points.

In the improved eddy current braking hoist control system disclosed herein, the excitation of the eddy current brake is adjusted to a different base value at standstill for each of several lowering speed points, and in each instance is increased with speed in such a manner that the torque output of the brake for the selected lowering speed point is correlated with the torque output of the motor for that speed point to provide improved lowering characteristics. The improved lowering characteristics result from the reduced excitation of the brake when operating in the lower speed range of a selected speed point and from the increased excitation of the brake in the higher speed range of the selected speed point. By properly correlating the base excitation of the brake and the rate of increase in excitation with speed for each lowering speed point with the value of motor secondary resistance for the corresponding speed point, improved speed regulation throughout the entire normal and abnormal loading range is obtained in all lowering speed points. For instance, a braking machine selected to provide adequate torque for the safe handling of overloads produces so much torque at slow speeds that considerable motor torque must be provided at slow speeds to provide adequate lowering speed for light loads in the slow speed points. This large motor torque results in unnecessary heating of both the motor and brake. On the other hand, by using increased brake excitation to provide the additional brake torque required for the safe handling of overloads and reducing this excitation at slow speeds permits the desired speed of light loads to be obtained with a reduced value of motor torque or increased light load speeds with larger values of motor torque. The increased excitation permits the use of a smaller brake and the smaller brake when excited at reduced excitation permits still greater reductions in motor torque for adequate speed of light loads. A similar correlation between brake size, brake excitation, and motor torque also provides improved hoisting operation.

The variable excitation for the brake is obtained in accordance with the invention by opposing a variable unidirectional voltage derived from the secondary circuit of the hoist motor with a larger constant unidirectional reference voltage. The resultant or differential voltage is impressed on the energizing winding of the brake and has a material value at standstill and increases with the speed of the motor up to synchronous speed. The voltage derived from the secondary circuit of the motor varies with speed as well as with the amount of resistance effective in the secondary circuit, and the value of the constant voltage is accordingly adjusted in coordinated relationship with the changes in the secondary resistance so that the resultant voltage has a range of variation for each lowering speed point which gives the desired improved performance.

It is an object of this invention to provide an improved alternating hoist control system having the foregoing operating advantages.

Another object is to provide an improved hoist control system for a polyphase wound rotor induction motor mechanically coupled to a braking generator constituting an artificial load for the motor which provides for excitation of the generator in relation to the speed of the motor.

A further object is to provide a hoist control system for a polyphase wound rotor induction motor mechanically coupled to a braking generator constituting an artificial load for the motor which provides for excitation of the generator in relation to the electrical condition of the secondary circuit of the motor.

A further object is to provide an alternating current hoist control system which correlates the characteristics of a polyphase wound rotor induction motor and an eddy current brake excited in relation to the secondary voltage of the motor.

A further object is to provide an improved alternating current hoist control system which correlates the characteristics of a polyphase wound rotor induction motor and an eddy current brake excited by a voltage which is the differential of a voltage derived from the secondary of the motor and a constant reference voltage.

Other objects and advantages will become apparent from the following description wherein reference is made to the drawings, in which.

Figure 1:
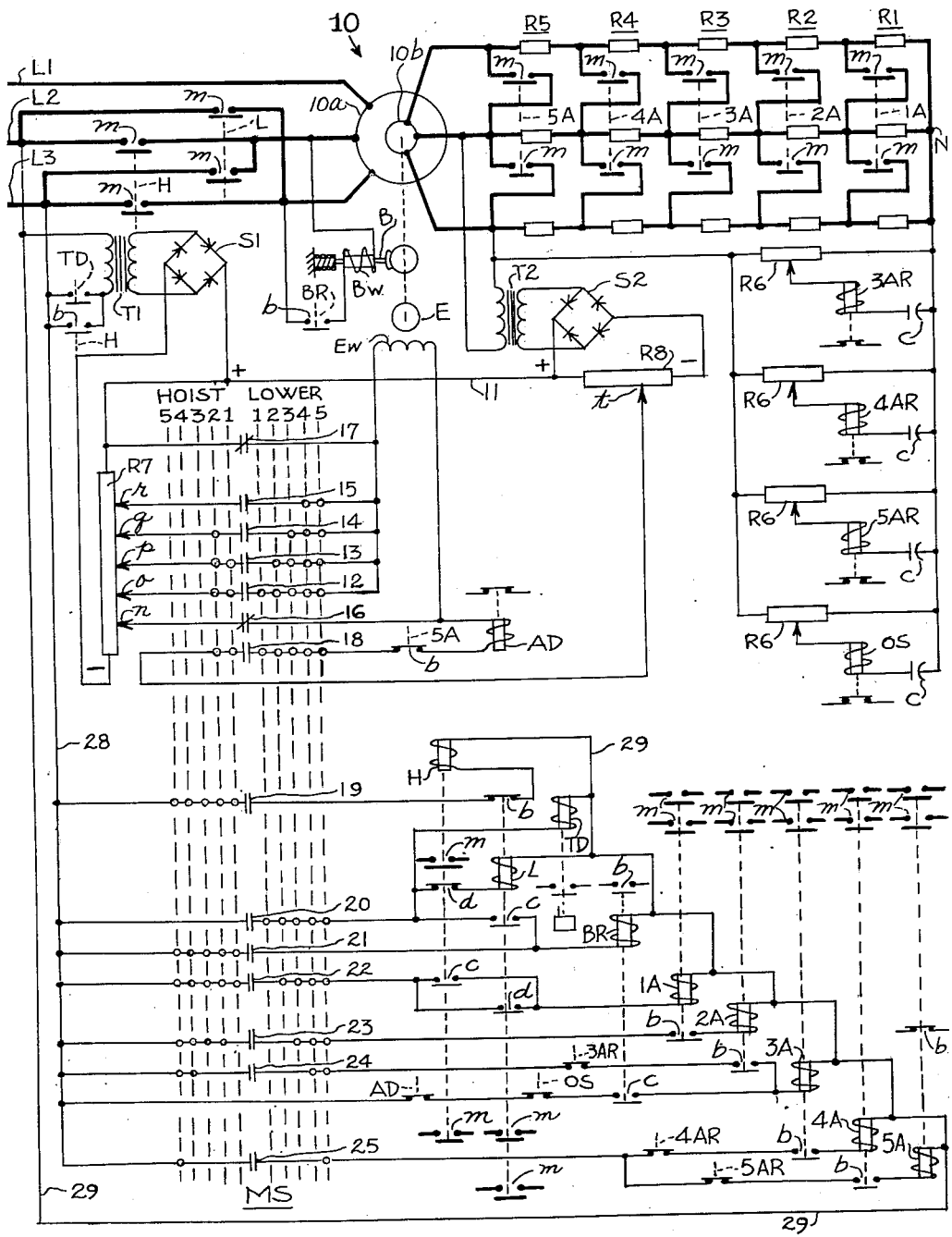
Fig. 1 is a wiring diagram illustrating the control system of this invention when connected to a motor and a braking machine such as an eddy current brake.

Referring to Fig. 1, a polyphase wound rotor induction motor 10 has a primary winding 10a arranged to be supplied with power from supply lines L1, L2, and L3 and has a secondary winding 10b connected to a balanced Y-connected resistance bank having sections R1, R2, R3, R4, and R5 and a neutral point N. The motor 10 is shown as provided with a suitable spring-applied, electro-magnetically-released friction brake B having an operating winding Bw. A suitable power consuming device or artificial load such as an eddy current brake E provided with an exciting winding Ew has its rotor or eddy current member coupled to the motor shaft either directly as indicated in Fig. 1 or by means of a suitable gear train (not shown). Although in the preferred embodiment of the invention the braking machine is shown as an eddy current brake, it will be understood that other types of generators and electric power consuming devices having suitable speed-torque characteristics, such, for example, as the newer magnetic brakes using powdered iron may be used if desired to obtain many of the advantages of this invention.

The control system illustrated in Fig. 1 comprises a plurality of electromagnetic contactors and relays each of which is diagrammatically shown on the drawing. To simplify the drawing, many of the contactor and relay contacts are shown in convenient physical locations in the wiring diagram as well as in conjunction with their respective operating windings.

Power connections for causing the motor 10 to operate in the hoisting direction are completed upon closure of main contacts m of an electromagnetic contactor H, and power connections for causing the motor 10 to operate in the lowering direction are completed upon closure of main contacts m of an electromagnetic contactor L.

Control of the amount of resistance effectively inserted in the secondary circuit of the motor 10 may be provided by a plurality of electromagnetic contactors 1A, 2A, 3A, 4A, and 5A, each having a pair of main contacts indicated at m for selectively short circuiting the resistance sections R1, R2, R3, R4, and R5. The secondary circuit may also include a plurality of electromagnetic, speed-responsive, acceleration relays 3AR, 4AR, and 5AR, and an overspeed relay OS. The relays 3AR, 4AR, and 5AR are connected in resonant operating circuits of the type described and claimed in Leitch Patent No. 2,165,491, and a complete description of their operation in a hoist controller may be had from McArthur et al. Patent No. 2,325,413. Hence, only a brief description of these relay circuits is included herein. The overspeed relay OS may be of any suitable type and for simplicity is shown as an electromagnetic relay connected in a similar resonant operating circuit.

Each of the resonant relay operating circuits comprises a suitable capacitor C and a potentiometer resistor R6, the resistors R6 being connected in parallel with each other between one of the secondary motor terminals and the neutral point N. The operating windings of the relays 3AR, 4AR, 5AR, and OS are connected in series with their respective capacitors C between an adjustable tap on their respective resistors R6 and the neutral point N. As explained in the aforementioned Leitch patent, the relays 3AR, 4AR, 5AR and OS have respective sets of normally-closed contacts which open concurrently upon application of power to the primary winding 10a and which close in sequence at predetermined speeds as the motor 10 accelerates depending upon the capacity of the respective capacitors C, closure of the relay contacts being caused by impairment of resonance of the respective relay circuits as the frequency of the secondary voltage decreases during acceleration of the motor.

The brake winding Bw is connected across two of the primary terminals of the motor 10 when contacts b of a suitable brake relay BR are closed.

The winding Ew of the eddy current brake E is energized at certain times during operation of the motor 10 by the resultant of two unidirectional voltages appearing across portions of respective potentiometer resistors R7 and R8 and for a time interval after deenergization of the motor 10 subsequent to a lowering operation by the unidirectional voltage across a portion of the resistor R7 alone. The resistor R7 is connected across the output terminals of a suitable fullwave rectifier S1, and the resistor R8 is connected across the output terminals of a suitable fullwave rectifier S2, the positive terminals of the resistors R7 and R8 being connected to each other by a conductor 11. A transformer T1 having its primary winding arranged to be connected across the supply lines L2 and L3 by slow-to-open, normally open contacts of a time delay relay TD or by normally open auxiliary contacts b of the hoisting contactor H supplies a substantially constant alternating voltage to the rectifier S1, and a transformer T2 having its primary winding connected across two of the terminals of the secondary winding 10b supplies an alternating voltage to the rectifier S2 which varies inversely with the speed of the motor 10 at speeds below synchronism. The resistor R8 has an adjustable tap $t$ and the resistor R7 has a plurality of adjustable taps $n$ through $r$, the taps $o$ through $r$ being selectively connectable to a terminal of the winding Ew by means of contacts 12 through 15, respectively, of a multiposition master switch MS also having contacts 16 through 25. The other terminal of the winding Ew is connected to the tap $t$ on the resistor R8 when the contacts 18 are closed. Hence, when the contacts 18 and selected ones of the contacts 12 through 15 are closed, the winding Ew is subjected to the algebraic sum of the voltage between the positive terminal of the resistor R8 and the tap $t$ and the voltage between the positive terminal of the resistor R7 and the selected tap or taps $o$ through $r$.

In the off position of the master switch MS, the contacts 16 and 17 are closed and all of the other master switch contacts are open. When the master switch MS is operated in either the hoisting or lowering direction, its contacts are open except as closure thereof is indicated by the circles in horizontal alignment with the contacts, each circle indicating that its horizontally aligned contacts are closed for the respective position of the master switch. Thus, for example, the contacts 13 are closed in the first two hoisting positions and in the last four lowering positions, and are open in all other positions. The contacts 19 through 25 are interposed in respective energizing circuits for the operating windings of all of the contactors and for the relays BR and TR and extending between conductors 28 and 29 which are connected to the supply lines L3 and L2, respectively.

An electromagnetic relay AD having its operating winding connected in series with the winding Ew is provided to protect against excessive lowering speeds in a manner to be described should the winding Ew inadvertently become deenergized during lowering. Before considering the operation of the control system of Fig. 1 in detail, its general functions will be explained with reference to Figs. 2 through 6.

Figure 2:
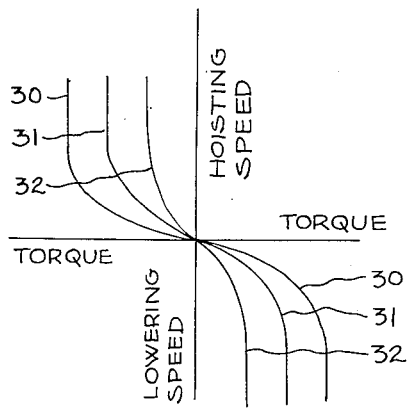
Fig. 2 is a graph showing operating characteristics of a suitable braking machine.

Curves 30, 31, and 32 of Fig. 2 are typical speed-torque curves of a preferred form of eddy current brake E, and are illustrative of speed-torque curves of other types of braking machines that might be used in accordance with this invention. The curve 30 indicates the operation of the brake E when the winding Ew is excited at its rated voltage, and the curves 31 and 32 indicate operation of the brake E when the winding Ew is excited by reduced constant voltages equal to sixty and twenty percent, respectively, of the rated voltage. The curves 30, 31, and 32 show that the torque of the eddy current brake E is at zero at standstill and increases with speed in opposition to the driving torque as the brake is driven in the hoisting and lowering directions. With constant voltages applied to the winding Ew, a definite maximum torque is produced by the brake E at a predetermined speed, the magnitude of the maximum torque and to a lesser degree the exact speed at which it is reached depending upon the value of the constant voltage impressed on the winding Ew.

Figure 3:
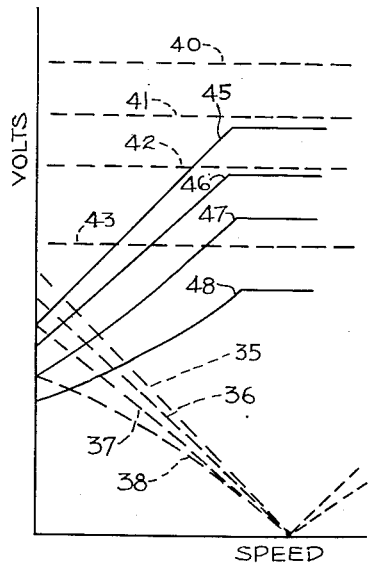
Fig. 3 is a graph showing how the resultant exciting voltages for the braking machine are obtained and how they vary with speed.

The curves of Fig. 3, wherein volts are plotted against speed of the motor 10, show how resultant voltages to be selectively impressed on the winding Ew are caused to increase with speed in accordance with this invention. Curves 35, 36, 37, and 38 show the variation, as the speed of the motor 10 changes, of the voltage between the positive terminal of the resistor R8 and the tap $t$ thereof for various effective values of external secondary circuit resistance. The curve 35 is for operation when none of the resistor sections R1, R2, R3, R4, R5 is short circuited, the curve 36 is for operation when only the resistor section R1 is short circuited, the curve 37 is for operation when both resistor sections R1 and R2 are short circuited, and the curve 38 is for operation when the resistor sections R1, R2, and R3 are short circuited. Curves 40, 41, 42, and 43 show the substantially constant voltages between the positive terminal of the resistor R7 and the left hand terminal of the winding Ew for various portions of the master switch MS. These voltages may decrease slightly with increase in the excitation of the brake E, but for purposes of explanation, and in operative effect, may be considered to be constant. Curves 45, 46, 47, and 48 show the variation of the resultant voltages at the terminals of the winding Ew when the variable voltages indicated by the curves 35, 36, 37, and 38 are opposed by the voltages indicated by the curves 40, 41, 42, and 43, respectively. It should be noted that the voltages 40, 41, 42, and 43 are in excess of their corresponding variable voltages even when the motor 10 is plugged at considerable speed.

Figure 4:
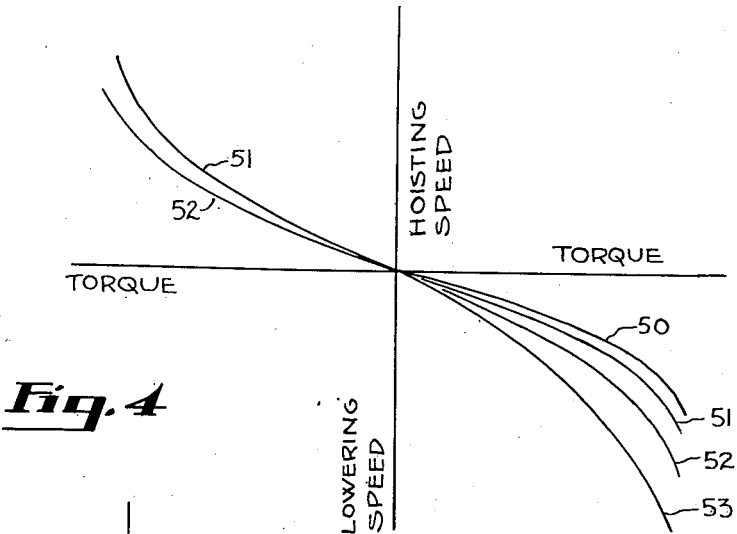
Fig. 4 is a graph showing operating characteristics of the braking machine when excited by the resultant voltages.

Curves 50, 51, 52, and 53 of Fig. 4 are speed-torque curves for the eddy current brake E when the winding Ew is excited by the voltages indicated by the curves 45, 46, 47, and 48, respectively. By comparing Fig. 4 with Fig. 2 it is to be noted that the variable excitation of the brake E causes the torque of the brake to increase continuously with speed throughout the operating range instead of merely increasing until a substantially fixed maximum value is reached. The variable excitation causes the torque to increase gradually with speed in the lower speed ranges, the slope of the brake torque curves depending upon the slope of the corresponding exciting voltage curves which, in turn, depends upon the relative magnitudes of the two opposed voltages.

Figure 5:
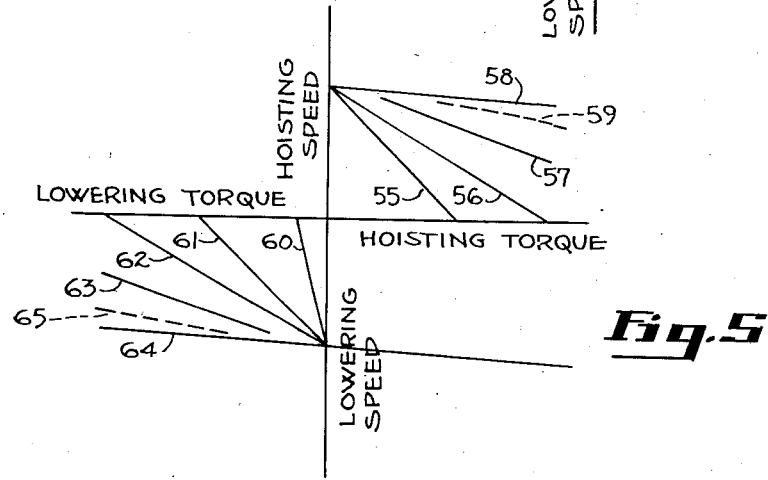
Fig. 5 is a graph showing operating characteristics of the motor.

The speed-torque curves of Fig. 5 show the several operating characteristics of the motor 10 that may be provided upon manipulation of the master switch MS. The motor 10 preferably operates as indicated by curves 55, 56, 57, 58 during hoisting, a curve 59 indicating an intermediate hoisting acceleration point. The motor 10 preferably operates as indicated by curves 60 through 64 during lowering, a curve 65 indicating an intermediate lowering acceleration point.

Figure 6:
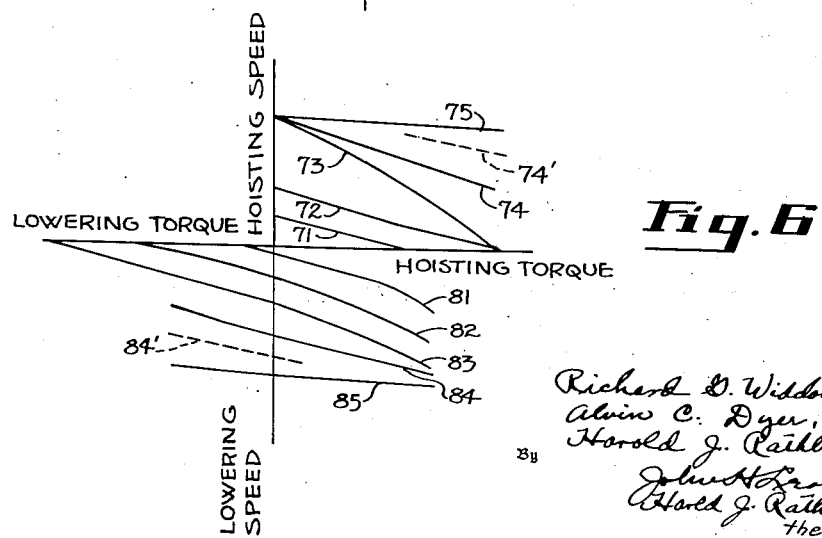
Fig. 6 is a graph showing combined operating characteristics of the motor and braking machine.

Fig. 6 shows resultant speed-torque characteristics that are obtained by combining the speed-torque characteristics of Fig. 4 and Fig. 5 in the manner herein disclosed. The curves of Fig. 6 thus show the operating characteristics of the hoist or the speed-torque relations at the common motor and brake shafts whereas the curves of Fig. 4 show the speed-torque relations of the eddy current brake E alone and the curves of Fig. 5 show the speed-torque relations of the motor 10 alone. In Fig. 6, curves 71 through 75 indicate the operation of the hoist during hoisting operations and likewise the curves 81 through 85 indicate the operation of the hoist during lowering operations. A curve 74' and a curve 84' indicate operation during acceleration between curves 74 and 75 and 84 and 85, respectively.

In the first hoisting speed point or master switch position, the motor 10 is connected so as to operate as indicated by the curve 55, the brake E is connected so as to operate as indicated by the curve 51, and the hoist operates as indicated by the curve 71. In the second hoisting position the motor operation is indicated by the curve 56, the brake operation is indicated by the curve 52, and the curve 72 becomes the resultant curve for the hoist. In the last three hoisting positions the brake E is deenergized and the motor 10 is used alone to hoist the load. Thus the curves 73, 74, 74', and 75 are the same as the curves 56, 57, 59, and 58, respectively.

In the first lowering speed point, the motor operates as indicated by the curve 60 and drives the brake E which exerts retarding torque as indicated by the curve 50, the curve 81 indicating the resultant torque. In the second, third, and fourth lowering positions of the master switch MS, the motor 10 operates as indicated by the curves 61, 62, and 63, respectively, the brake E operates as indicated by the curves 51, 52, and 53, respectively, and the resultant torque varies as indicated by the curves 82, 83, and 84 respectively. The brake E remains energized during acceleration of the motor between the curves 63 and 65 so that the curve 84' becomes a resultant acceleration curve in lowering. In the fifth lowering position, the brake E is deenergized, and the motor 10 operates in accordance with the curve 85 which is the same as the curve 64. It should be noted that the resultant torque in all lowering positions increases continuously with speed so that overloads cannot cause excessive speeds to be reached regardless of the speed point selected. Since the brake torque is relatively low in the lower speed range for each of the first four lowering speed points, and increases gradually and continuously to relatively high values in the higher speed ranges of each of these speed points, the speed regulation of the hoist is improved.

In prior eddy current brake hoist controllers using constant voltages for exciting the eddy current brake and in which the brake has been driven by a polyphase wound rotor induction motor operating with balanced polyphase voltages, relatively large increases in speed are obtained when the overhauling torque exceeds a value in the neighborhood of rated load. In the slower lowering speed points of such controllers, the resultant torque fails to increase rapidly enough with speed to prevent run-away conditions to be approached unless a relatively large brake is used. The constant excitation of the large brake causes the brake torque to be larger than necessary at slow speeds in all lowering speed points thus resulting in speeds which are too slow and in undue brake and motor heating. By varying the brake excitation with speed in the manner herein disclosed, the brake torque during lowering is maintained relatively low for small loads and is increased for larger loads so that the lowering speed increases very little with load in all speed points. Improved correlation between brake and motor torque is thereby easily obtained. The resultant retarding torque in all lowering speed points increases continuously and rapidly with speed even beyond the usual overload range. The overall heating of both the brake and motor is reduced because the brake torque output which loads the motor is controlled in accordance with the need for the torque.

Prior eddy current braking hoist controllers in which pilot generators have been used as the source of excitation of the brake have not provided the desired correlation herein described and further the use of an extra rotating machine renders them too costly and complicated for many installations. By utilizing the variation in secondary voltage of the motor to alter the torque output of the brake in the manner herein described, the applicants have succeeded in providing a coordinated controller of extreme simplicity providing advantages not heretofore obtainable.

Considering now the detailed operation of the control system, in the first hoisting position of the master switch MS, the contacts 19 and 21 close to complete energizing circuits for the contactor H and the relay BR, respectively, the circuit for the contactor H including normally closed auxiliary contacts b of the contactor L. The contactor H thereupon responds to close its contacts m to connect the motor 10 for hoisting operations and the relay BR responds to close its contacts b to complete an energizing circuit for the winding Bw of the brake B which thereupon releases. The contacts 22 also close in the first hoisting position, and, after closure of normally-open contacts c of the contactor H, complete an energizing circuit for the contactor 1A which thereupon closes its contacts m to short-circuit the resistor section R1. The motor 10 is now connected for operation in accordance with the curve 55 of Fig. 5.

As soon as the contacts m of the contactor H close, the relays 3AR, 4AR, 5AR, and OS pick-up to open their respective normally-closed contacts. The opening of these contacts has no effect at this time.

Closure of the contacts m of the contactor H also causes the transformer T2 to supply an alternating voltage to the rectifier S2 whereby a unidirectional voltage appears across the resistor R8 with the polarity indicated. Closure of the contacts b of the contactor H connects the transformer T1 to the supply lines L2 and L3 whereby a unidirectional voltage appears across the resistor R7 with the polarity indicated.

In the first hoisting position of the master switch MS, the contacts 16 and 17 are open and the contacts 12, 13, and 18 are closed. This connects the winding Ew between the tap t on the resistor R8 and the taps o and p on the resistor R7 in series with the operating winding of the relay AD and normally-closed contacts b of the contactor 5A. The tap t on the resistor R8 is so adjusted that, with the resistor sections R2 through R5 effective in the secondary circuit, the voltage between the positive terminal of the resistor R8 and the tap t varies as indicated by the curve 36 in Fig. 3. The taps o and p on the resistor R7 are so selected that the voltage between the positive terminal of the resistor R7 and the taps o and p when the contacts 12 and 13 are closed is as indicated by the curve 41 of Fig. 3. Since the respective positive terminals of the resistors R7 and R8 are interconnected by the conductor 11, the voltages 36 and 41 are opposed and the voltage across the winding Ew is the resultant thereof and varies as indicated by the curve 46 as the speed of the motor 10 changes. With the voltage 46 impressed on its winding Ew, the eddy current brake E operates as indicated by the curve 51 of Fig. 4. As mentioned above, the motor is now operating as indicated by the curve 55 of Fig. 4, and the resultant torque available to hoist a load varies as indicated by the curve 71 of Fig. 6.

In the second hoisting position of the master switch MS, the contacts 23 close to complete the energizing circuit for the contactor 2A through the now closed normally open auxiliary contacts b of the contactor 1A. The contactor 2A thereupon closes its contacts m to short circuit the additional resistor section R2 and the motor is now connected for operation as indicated by the curve 56 of Fig. 5. Also, in the second hoisting position, the contacts 14 of the master switch MS close, short circuiting the portion of the resistor between the taps p and q and connecting the winding Ew between the taps o, p, and q on the resistor R7 and the tap t on the resistor R8. The voltage between the positive terminal and the taps o, p, and q of the resistor R7 with the contacts 12, 13, and 14 closed is as indicated by the curve 42 in Fig. 3 and the voltage between the positive terminal and the tap t of the resistor R8 now varies in accordance with the curve 37 of Fig. 3. The resultant voltage indicated by the curve 47 is impressed on the winding Ew causing the eddy current brake E to exert a torque as indicated by the curve 52 of Fig. 4. Since the motor 10 is now connected for operation as indicated by the curve 56 of Fig. 5, the resultant torque available to hoist a load varies as indicated by the curve 72 of Fig. 6.

In the third hoisting position, the contacts 12, 13, 14, and 18 of the master switch MS open to disconnect the winding Ew from its source of energization. Since the eddy current brake E is now deenergized the torque available at the motor shaft is as indicated by the curve 73 of Fig. 6 which is the same as the curve 56 of Fig. 5.

In the fourth hoisting position of the master switch MS, the contacts 24 close to partially complete an energizing circuit for the contactor 3A. When the speed of the motor 10 reaches a predetermined value, or if it is already at that value, the relay 3AR closes its contacts. The energizing circuit for the contactor 3A is then completed through now closed normally open auxiliary contacts b of the contactor 2A. The resultant closure of the contacts m of the contactor 3A short circuits the additional resistor section R3 and the motor 10 now operates as indicated by the curve 57 of Fig. 5 which is the same as the curve 74 of Fig. 6.

Movement of the master switch MS to the last hoisting position closes the contacts 25 which partially complete energizing circuits for the contactors 4A and 5A. When the motor speed reaches a predetermined value, the relay 4AR closes its contacts to complete, through now closed normally open auxiliary contacts b of the contactor 3A, an energizing circuit for the contactor 4A. The resultant closure of the contacts m of the contactor 4A short circuits the additional resistor section R4, and causes the motor to accelerate as indicated by the curve 58 of Fig. 5 until a speed is reached at which the relay 5AR closes its contacts to complete an energizing circuit for the contactor 5A through the now closed normally open auxiliary contacts b of the contactor 4A. The contactor 5A thereupon responds to short circuit all of the secondary resistor sections R1 through R5. The motor now operates as indicated by the curve 53 of Fig. 5 and the hoist operates as indicated by the curve 75 of Fig. 6.

Return of the master switch MS from the last hoisting position to the off position results in a switching sequence opposite to that just described. When the off point is reached, the motor 10, the brake B, and the eddy current brake E are all deenergized and the load is held in the elevated position by the brake B.

In the first lowering position of the master switch MS, the contacts 20 close to complete an energizing circuit for the contactor L through normally-closed auxiliary contacts d of the contactor H. The contactor L thereupon respond to close its contacts m to connect the motor 10 for lowering operations and closes its normally open auxiliary contacts c to complete an energizing circuit through the contacts 20 for the relay BR which responds to close its contacts b causing the brake B to release. The motor is now connected for operation as indicated by the curve 60 of Fig. 5, all of the resistor sections R1 through R5 being effective in the secondary circuit.

As soon as the contacts m of the contactor L close, the relays 3AR, 4AR, 5AR, and OS pick up to open their respective normally closed contacts.

Closure of the contacts 20 also completes the energizing circuit for the time delay relay TD which thereupon closes its contacts immediately to connect the primary winding of the transformer T1 across the supply lines L2 and L3.

Also, in the first lowering position, the contacts 16 and 17 are open and the contacts 12 and 18 are closed, and consequently the winding Ew is connected between the tap t on the resistor R8 and the tap o on the resistor R7. With the resistor sections R1 through R5 effective in the secondary circuit, the voltage between the positive terminal of the resistor R8 and the tap t varies as indicated by the curve 35 of Fig. 3. The tap o on the resistor R7 is so selected that the voltage between the positive terminal of the resistor R7 and the tap o is as indicated by the curve 40 of Fig. 3. The voltages 35 and 40 are opposed to each other and the voltage across the winding Ew is the resultant thereof and varies as indicated by the curve 45. With the voltage 45 impressed on its winding Ew the eddy current brake E operates as indicated by the curve 50 of Fig. 4. As mentioned above, the motor is now operating as indicated by the curve 60 of Fig. 5, and consequently the resultant torque available to retard a load varies as indicated by the curve 81 of Fig. 6.

As soon as a low value of excitation current flows through the winding Ew, the relay AD operates to open its normally-closed contacts which are connected in series with normally-open contacts c of the relay BR and the normally closed contacts of the relay OS in an emergency energizing circuit for the contactor 3A. This circuit is interrupted by opening of the contacts of the relay OS as soon as power is applied to the primary of the motor and prior to closure of the contacts c of the relay BR. Should the motor 10 accelerate to a speed higher than the speed setting of the relay OS before the contactor 3A closes, the relay OS drops out and closes its contacts. This high speed can be obtained only if the excitation of the eddy current brake E has failed which would cause closure of the relay AD. This emergency excitation of the contactor 3A removes sufficient resistance from the secondary circuit to limit the speed of the motor 10 to a safe value by regenerative braking.

In the second lowering position of the master switch MS, the contacts 22 close to complete an energizing circuit for the contactor 1A through the now closed normally open auxiliary contacts d of the contactor L. Also, in the second lowering position, the contacts 13 of the master switch MS are closed and connect the winding Ew between the taps o and p on the resistor R7 and the tap t on the resistor R8. The voltage impressed on the winding Ew and the amount of secondary resistance in the secondary circuit is the same as for the first hoisting position and the motor operates as indicated by the curve 61 of Fig. 5, the brake operates as indicated by the curve 51 of Fig. 4, and the hoist operates as indicated by the curve 82 of Fig. 6.

In the third lowering position of the master switch MS, the contacts 23 close to complete the energizing circuit for the contactor 2A through the now-closed auxiliary contacts b of the contactor 1A. The contactor 2A thereupon closes its contacts m to short circuit the additional resistor section R2 which causes the motor to operate as indicated by the curve 62. Also, in the third lowering position, the contacts 14 close to connect the eddy current brake winding Ew between the taps o, p, and q and the tap t so that the voltage across the winding Ew is as indicated by the curve 47 of Fig. 3 and the torque output of the brake E is as indicated by the curve 52 of Fig. 4. The resultant speed-torque characteristic of the hoist is the curve 83.

In the fourth lowering position of the master switch MS, the contacts 24 close to partially complete an energizing circuit for the contactor 3A through the now-closed auxiliary contacts b of the contactor 2A which circuit is completed upon closure of the contacts of the relay 3AR when a predetermined speed is reached. Response of the contactor 3A causes the additional resistor section R3 to be short circuited and the motor operates as indicated by the curve 63. Also, in the fourth lowering position, the contacts 15 close to connect the winding Ew between the taps o, p, q and r and the tap t so that the voltage across the winding Ew varies as indicated by the curve 48 of Fig. 3. The torque output of the brake E is now as indicated by the curve 53 of Fig. 4 and the hoist operates as indicated by the curve 84.

Movement of the master switch MS to the fifth lowering position partially completes the energizing circuits for the contactors 4A and 5A. The circuit for the contactor 4A is completed through the now closed contacts b of the contactor 3A upon closure of the contacts of the relay 4AR, and the contacts m of the contactor 4A thereupon close to short circuit the additional resistor section R4 causing the motor to operate as indicated by the curve 65. Since the contacts 12, 13, 14, and 15 remain closed in the fifth lowering position, the excitation of eddy current brake E is not materially altered upon operation of the contactor 4A and the resultant hoist characteristic is as indicated by the curve 84'. When a speed is reached causing the contacts of the relay 5AR to close, the contactor 5A responds to short circuit all of the secondary resistance and the motor operates as indicated by the curve 64. Opening of the normally closed auxiliary contacts b of the contactor 5A disconnects the winding Ew from its source of energization, and the brake E no longer exerts a retarding torque. Overhauling loads are now lowered by regenerative braking alone as indicated by the curve 85.

Upon return of the master switch MS from any one of the lowering points to the off point, the contactors L and 1A through 5A and the relays TD and BR are deenergized. The contacts 16 and 17 are now closed and connect the winding Ew between the tap n and the positive terminal of the resistor R7. Since the contacts of the time delay relay TD remain closed for a time interval after deenergization of their operating winding, the brake E remains excited for a predetermined time interval after the master switch MS is returned to the off position and assists the friction brake B in bringing the load to a stop.

Although in the controller illustrated, adjustable voltages have been taken from the resistor R7 in order to obtain the spread in the resultant voltages 45 through 48, it is apparent that taps on the resistor R8 could be provided instead for this purpose, or taps on both resistors could be utilized.

It is also apparent that one or more steps of unbalanced voltage braking could be provided for the motor 10 with or without assistance from the braking generator.

Although, in the illustrative embodiment, the same acceleration relays are used during both hoisting and lowering and are arranged to operate at the same selected speeds, respectively, whether lowering or hoisting, means could be provided to alter the operating characteristics of the relays for lowering control or separate relays and relay circuits could be used for hoisting and lowering as is well known in the art.

Having thus described our invention, we claim:

1. A control system for the type of hoists powered by a polyphase wound rotor induction motor having an external secondary circuit and arranged to drive loads and to be driven by descending loads, selectively, and mechanically coupled to a braking generator means having flux producing winding means and operable to exert different degrees of torque depending upon the excitation of the winding means, said control system comprising the combination with reversing means operable to connect the motor to a source of power for causing the motor to hoist said loads and to drive said loads downwardly, selectively, a resistor arranged to be connected in said secondary circuit, switching means operable to adjust the effective resistance of said resistor, circuit means for supplying current to said winding means, and means for connecting the circuit means to a source of substantially constant voltage for excitation thereby, of additional means for concurrently connecting said circuit means to said secondary circuit for concurrently exciting said circuit means in accordance with an electrical condition of said secondary circuit in opposition to said excitation provided by said constant voltage.

2. A control system according to claim 1 characterized in that said circuit means includes a pair of resistors adapted to be connected one across said substantially constant source and the other across two terminals of said secondary circuit, and means for connecting the said winding means between taps on said resistors.

3. A control system for the type of hoists powered by a polyphase wound rotor induction motor arranged to drive loads and be driven by descending loads, selectively, and mechanically coupled to a braking generator having a flux producing winding and operable to exert a braking torque in relation to the degree of excitation of its winding, said control system comprising the combination with reversing means operable to connect the motor to a source of power for causing the motor to hoist said loads and to drive said loads downwardly, selectively, of means for producing a variable potential that varies inversely with the speed of said motor, constant potential means for producing a substantially constant reference potential, circuit means for opposing said two potentials to obtain a differential potential that varies directly with the speed of said motor, and means for connecting said flux producing winding to said circuit means for energizing said winding by said differential potential.

4. A control system in accordance with claim 3 characterized in that said constant potential means is adapted to produce a potential larger than said variable potential when said motor is at rest.

5. A control system in accordance with claim 3 characterized in that an external secondary circuit is provided for said motor and said means for producing said variable potential comprises a rectifier connected to and supplied from said secondary circuit.

6. A control system in accordance with claim 3 characterized in that an external secondary circuit is provided for said motor and includes a resistor, secondary switching means are arranged to adjust said resistor thereby to alter the speed-torque characteristic of said motor, said circuit means includes adjusting means for adjusting said differential potential, and an interlocking control means operatively interconnects said switching means and said adjusting means and is operable to adjust said secondary resistance and to adjust said differential potential in predetermined coordinated relationship.

7. A braking control system for the type of hoists powered by a polyphase wound rotor induction motor arranged to drive loads and be driven by descending loads, selectively, said system comprising the combination with a braking generator arranged to be mechanically connected to said motor and having a flux producing winding the degree of excitation of which controls the braking torque of said generator, and reversing means operable to connect the motor to a source of power for causing the motor to hoist said loads and to drive said loads downwardly, selectively, of means for producing a variable potential that varies inversely with the speed of said motor, means for producing a substantially constant reference potential, circuit means for opposing said two potentials to obtain a differential potential that varies directly with the speed of said motor, and means connecting said flux producing winding to said circuit means for energizing said winding by said differential potential.

8. In combination, a braking generator having a flux producing winding, an exciting circuit for supplying said flux producing winding, means mechanically coupling the generator to a polyphase wound rotor induction motor having a secondary circuit, said exciting circuit comprising means including a rectifier connected to said secondary circuit for providing a unidirectional potential which varies inversely with the speed of said motor, means for supplying a source of substantially constant unidirectional reference potential, circuit means for opposing said two potentials so as to obtain a differential potential that varies directly with the speed of said motor, and means connecting said circuit means to said flux producing winding for energizing said winding by said differential potential.

9. A control system for the type of hoists powered by a polyphase wound rotor induction motor having an external secondary circuit and arranged to drive loads and to be driven by descending loads, selectively, and mechanically coupled to a braking generator means having flux producing winding means and operable to exert different degrees of torque depending upon the excitation of the winding means, said control system comprising the combination with reversing means operable to connect the motor to a source of power for causing the motor to hoist said loads and to drive said loads downwardly, selectively, a resistor arranged to be connected in said secondary circuit, switching means operable to adjust the effective resistance of said resistor, circuit means for supplying current to said winding means, and means for connecting said circuit means to a source of substantially constant voltage to produce in a portion of said circuit means a substantially constant reference voltage, of additional means for concurrently connecting said circuit means to said secondary circuit for concurrently producing in a portion of said circuit means a voltage which varies in accordance with an electrical condition of said secondary circuit, said circuit means including terminals across which a resultant voltage appears that is determined by the values of said substantially constant voltage and said variable voltage and varies directly with the speed of the motor, and means connecting said winding means to said terminals.

10. In combination, a braking generator having a flux producing winding, an exciting circuit for supplying said flux producing winding, means mechanically coupling the generator to a polyphase wound rotor induction motor having a secondary circuit, said exciting circuit comprising means including a rectifier connected to said secondary circuit for providing a unidirectional potential which varies inversely with the speed of said motor, means for supplying a source of constant unidirectional reference potential, circuit means for combining said two potentials so as to obtain a resultant potential that varies directly with the speed of said motor, and means connecting said circuit means to said flux producing winding for energizing said winding by said resultant potential.

RICHARD G. WIDDOWS.
ALVIN C. DYER.
HAROLD J. RATHBUN.

No references cited.